United States Patent [19]

Nowakowski

[11] Patent Number: 5,079,729
[45] Date of Patent: * Jan. 7, 1992

[54] ALIGNMENT MEASURING SYSTEM & METHOD

[76] Inventor: Karol L. Nowakowski, 1473 N.W. Quincy St., Bend, Oreg. 97701

[*] Notice: The portion of the term of this patent subsequent to Apr. 10, 2007 has been disclaimed.

[21] Appl. No.: 228,548

[22] Filed: Aug. 4, 1988

[51] Int. Cl.$^5$ .................. G01B 5/14; G06F 15/20; B65H 20/00; B65G 43/00
[52] U.S. Cl. .................. 364/559; 364/478; 226/174; 198/341; 198/502.1; 144/356
[58] Field of Search .......... 364/478, 556, 559–561; 226/20, 27, 28, 174; 73/865.9; 250/548, 559, 561; 198/341, 502.1; 144/356; 271/226, 227, 258, 259

[56] References Cited

U.S. PATENT DOCUMENTS

| | | | |
|---|---|---|---|
| 3,603,446 | 9/1971 | Maxey et al. | 271/227 X |
| 3,890,509 | 6/1975 | Maxey | 250/561 |
| 3,927,705 | 12/1975 | Cromeens et al. | 198/341 X |
| 4,249,080 | 2/1981 | Pritchett et al. | 271/259 X |
| 4,392,204 | 7/1983 | Prim et al. | 364/560 X |
| 4,865,309 | 9/1989 | Beasock et al. | 271/227 |
| 4,914,964 | 4/1990 | Spieser | 198/502.1 X |

Primary Examiner—Parshotam S. Lall
Assistant Examiner—E. J. Pipala
Attorney, Agent, or Firm—Flehr, Hohbach, Test, Albritton & Herbert

[57] ABSTRACT

An apparatus for measuring the alignment of two or more adjacent lugs while the lugs are in motion is provided. The alignment measuring apparatus includes a first scanner for detecting the leading edge of a first lug and a second scanner for detecting the leading edge of a second lug positioned adjacent the first. Timing means are provided for measuring the time differential between detection of the first and second lugs and computation means are provided for determining whether adjacent lugs are within alignment tolerances based in part upon the differential time measurement. Alternatively, differential distance measuring means are provided to directly measure the misalignment between the lugs.

19 Claims, 6 Drawing Sheets

```
Date : 10/20/81  TIME : 13:20

MISALIGNED LUGS

8

23

137

138

#140

#192

EFFICIENCY LOSS 5.2 %
```

FIG.- 6.

ALIGNMENT MEASURING SYSTEM & METHOD

This application is related to co-pending application Ser. No. 228,371, now U.S. Pat. No. 4,914,964 filed Aug. 4, 1988, which is incorporated herein by reference.

The present invention relates generally to an improved method and apparatus for measuring precise alignments of adjacent moving targets.

BACKGROUND OF THE INVENTION

In many automated production environments moving conveyors are used to transport components and/or production parts. Many applications require that the load carried by the conveyor be affirmatively held in place on the conveyor in order to facilitate one or more particular steps in the production or fabrication process. Often, it is also necessary to precisely position the load on the conveyor to facilitate a precision cutting, measuring or assembly step. To facilitate such positioning, conveyors are traditionally outfitted with one or more outwardly extending lugs which are adapted to engage particular loads carried by the conveyor. One common approach is to use a pair of spaced apart parallel lugs that have precisely aligned front surfaces.

A good example of an assembly that incorporates a conveyor system of the type described above is a finger-joint cutting machine used within the lumber industry to make the precision cuts necessary to form finger joints. Specifically, the conveyor forms an endless loop and a multiplicity of load stations are disposed about the endless loop at relatively equidistant intervals. Each load station includes two or more lugs which are precisely positioned relative to each other to carry a single piece of finger-joint stock. By way of example, a representative conveyor may have in the range of 40 to 100 load stations with the lugs placed on six inch centers. Air bags are used to push down upon the finger-joint stock to firmly hold it in place as the conveyor carries the stock through various cutting and gluing stations.

If for any reason the cuts are not precisely made, the resultant finger-joints are defective due to openness in the joint area. Within conventional finger-joint production lines, the majority of the open joint defects that actually occur are directly attributable to misalignment of the lugs within one or more particular load stations. The precise tolerances required for the finger-joints dictate that if the lugs are out of alignment by as little as 2-5 mils, the cuts made by the finger-joint machine will produce unacceptable parts having open joints. These strict tolerances have created enormous difficulties within the industry because even if the lugs in only one load station are out of alignment, a large number of unacceptable products are produced and there is no easy way to identify the source of the defective parts. Therefore, the defective parts are often not discovered until well downstream of the cutting machines at which time the part is typically a complete loss or requires expensive rework to salvage. When defects begin occurring, the plant operators are faced with the decision of having to shut down the entire production line while the alignment of the lugs in each of the alignment stations are checked, (a process which may take 45 minutes) or to accept the high defect rate that will necessarily occur due to the lug misalignment. Neither option is an acceptable scenario.

To minimize the occurrence of lug misalignment, the alignment of each lug pair is typically checked by hand after every shift and aligned by hand with a square. Such a process is time consuming, expensive, and does not eliminate the development of misalignment during a production shift. It will be appreciated that the above described misalignment problem can cause difficulties in a wide variety of production and materials handling operations outside of the finger-joint industry, although the severity of the consequences of slight misalignments may vary a great deal from operation to operation. Other applications requires even greater precision then that described above. For example, many metal-working applications require alignment resolution on the order of 1 mil or less. Therefore, there is a need for a device capable of accurately testing the alignment of devices such as conveyor lugs on the fly.

SUMMARY OF THE INVENTION

Accordingly, it is a primary objective of the present invention to provide an alignment measuring device capable of automatically determining the alignment of a pair of spaced targets while the targets are in motion.

Another objective of the invention is to provide a mechanism for specifically identifying individual stations on an endless conveyor that are out of alignment.

To achieve the foregoing and other objects and in accordance with the purpose of the present invention, an apparatus for measuring the alignment of two or more adjacent targets having alignment reference indicia, while the targets are in motion is provided. The alignment measuring apparatus includes a first scanner for detecting the alignment reference of a first target and a second scanner for detecting the alignment reference of a second target positioned adjacent the first. Both scanners produce output signal capable of identifying the detection of their associated targets. Differential means are provided for obtaining a differential measurement indicative of the misalignment between the first and second targets. Computation means are provided for determining whether adjacent lugs are within alignment tolerances based in part upon the differential measurement. In one of the most preferred embodiments the differential measurements are differential time measurement indicative of the time delay between detection of the leading edges of the first and second targets. In an alternative embodiment, the differential measurement is a distance measurement that directly measures the distance between the first and second targets.

In a preferred embodiment that utilizes differential time measurements, each scanner generates an electrical presence signal the entire time it detects the presence of a target and timing means are provided for measuring the time delay between detection of the first and the second targets. The timing means includes a voltage comparator that receives the presence signals and outputs a time delay signal indicative of the time differential between detection of the first and the last presence signal. The time delay signal is transmitted to the computation means which may take the form of a microprocessor. In another preferred embodiment, the computation mean activates an alarm signal that notifies an operator when misaligned lugs are detected.

In still another preferred embodiment, the lugs are carried by an endless conveyor having a multiplicity of load stations each having at least a pair of lugs and the computation means also keeps track of the particular load stations that are misaligned and informs an operator or a conveyor feed mechanism not to load stock into the misaligned load stations.

In a preferred distance measuring embodiment of the invention, a shaft encoder is directly coupled to the endless conveyor. The differential means measures the rotation of the shaft between detection of the first and second targets.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 6 is a representative printer output for the system shown in FIG. 4.

DETAILED DESCRIPTION OF THE DRAWINGS

Figure 1:
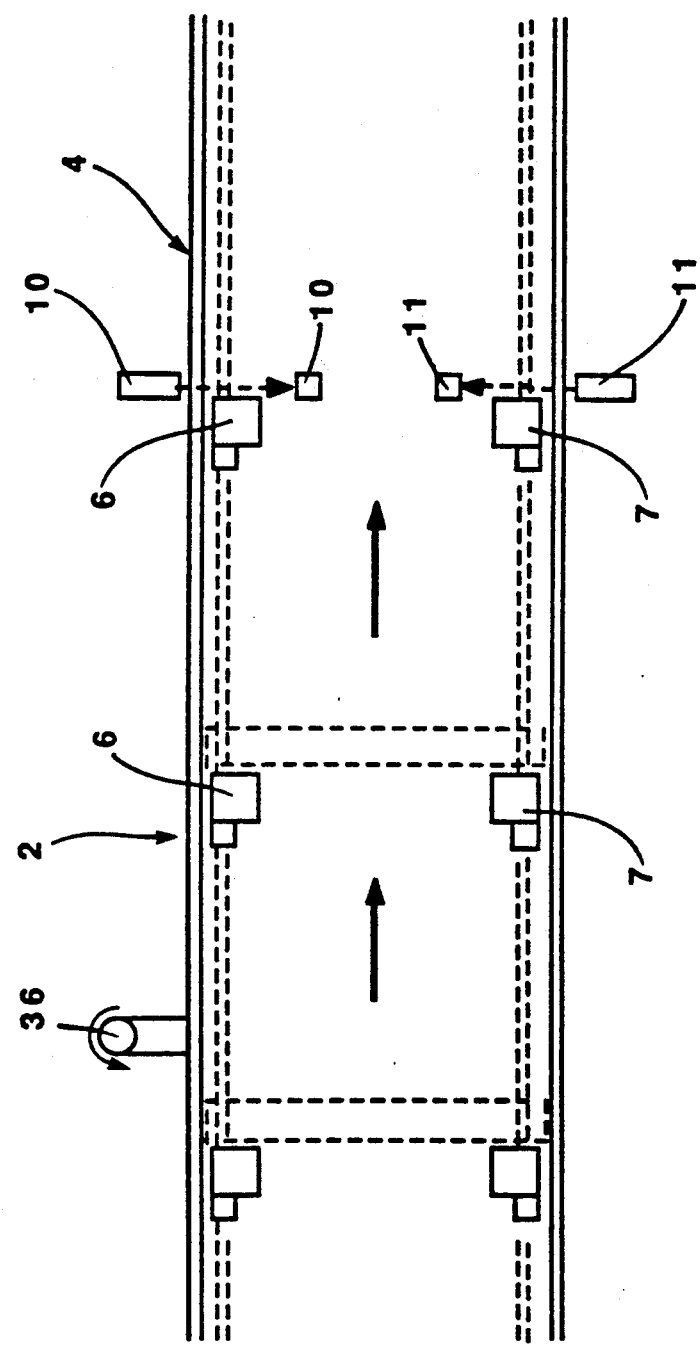
FIG. 1 is a diagrammatic top view of a conveyor system that incorporates the scanning system of the present invention.

As illustrated in the drawings, the present invention relates to an alignment measuring device for measuring the alignment of various items on the fly. The embodiment of the invention chosen for the purposes of illustration measures misalignment of a multiplicity of load stations 2 that are carried by a rotatable endless conveyor 4. Each load station 2 includes two or more adjacent lugs 6 which are adapted to engage individual items carried by the conveyor 4. The alignment measuring device includes a pair of scanners 10,11 each positioned to detect the presence of a lug immediately adjacent thereto. The scanners 10, 11 are adapted to precisely detect the leading edge of each passing lug and to produce a signal 12, 13 during the entire time period that they "see" a lug. The scanners are also positioned with respect to one another such that when the lugs are in perfect alignment, the scanners will simultaneously detect the leading edge of their associated passing lugs. Differential means are provided for obtaining a differential measurement indicative of the misalignment between the first and second lugs. Computation means are provided for determining whether adjacent lugs are within selected alignment tolerances based in part upon the differential measurement.

Referring initially to FIG. 1, the lugs from sequential load stations 2 are arranged such that a first one of each lug pair (lugs 6) will pass by scanner 10, while a second lug of each lug pair (lugs 7) will pass by scanner 11. It should be apparent that each load station 2 could have several lugs and that separate scanners could readily be provided for each additional set of lugs. In the embodiment chosen for the purposes of illustration, the scanners 10,11 are precisely positioned with respect to one another, such that when the lugs 6 and 7 are precisely aligned, their leading edges will be detected simultaneously by the scanners. However, it should be apparent that if the scanners are offset somewhat, the computation means can be designed or programmed to compensate of the offset so long as the offset is consistent from reading to reading.

Figure 2:
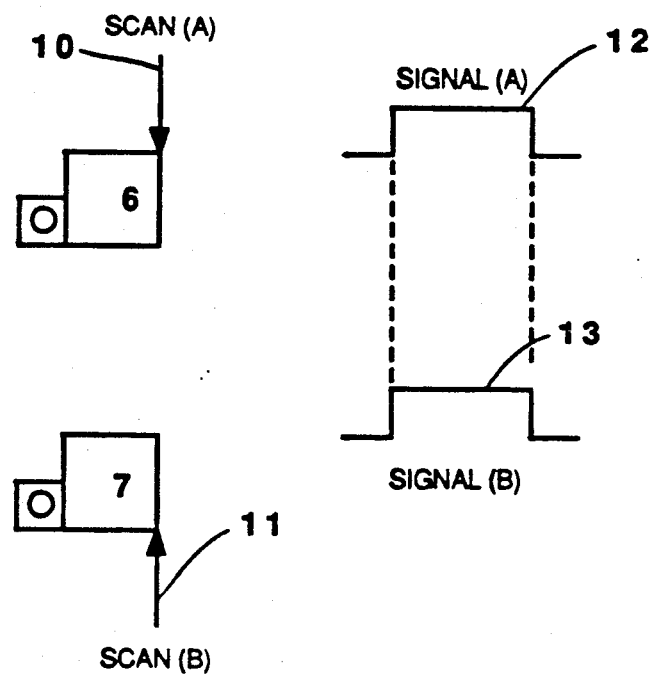
FIG. 2 is a diagrammatic side view of a pair of aligned lugs together with a schematic representation of the signals generated by the scanners shown in FIG. 1 as the aligned lugs pass by the scanners.
Figure 3:
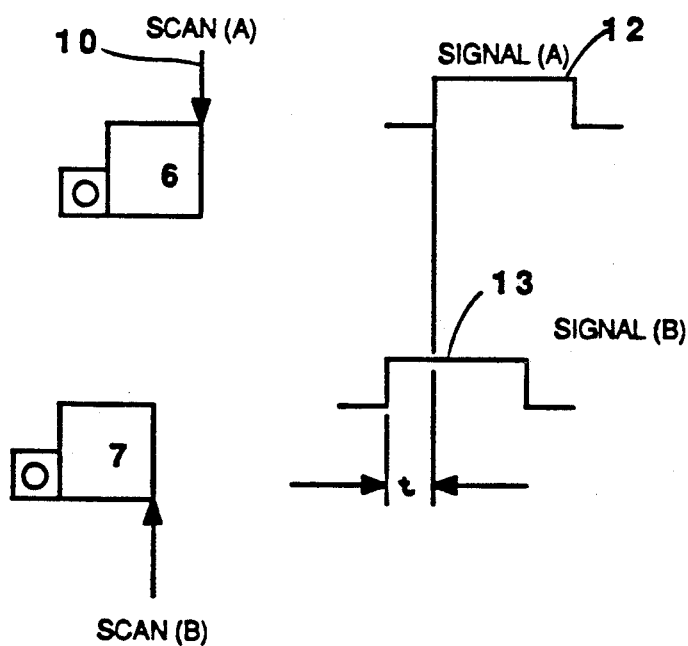
FIG. 3 is a diagrammatic side view of a pair of misaligned lugs together with a schematic representation of the signals generated by the scanners shown in FIG. 1 as the misaligned lugs pass by the scanners.

Scanners 10,11 preferably take the form of LED scanners having an emitter and a receiver positioned on opposite sides of the travel path of their associated lug sets. When a lug passes between the emitter and the receiver, a light beam is broken and the LED scanner emits an electrical signal indicative of the break. Referring next to FIG. 2, when the lugs are precisely aligned, the signal 12 outputted by scanner 10 will begin simultaneously with signal 13 outputted by scanner 11. If the lugs are misaligned to any extent, there will be a time delay (designated as period "t" between the beginning of signals 12 and 13 as seen in FIG. 3. The length of time delay "t" will be a function of the speed at which the conveyor is traveling and the misalignment of the lugs within a particular load station. Therefore, the misalignment can be measured in one of two ways. Initially, the misalignment can be measured by measuring the distance between the lugs. As seen in FIG. 1, this can be accomplished by a shaft encoder coupled directly to the endless conveyor 4. If the rotation of the shaft encoder is proportional to the distance the conveyor travels, then a counter can be utilized to track the rotation of the shaft encoder to calculate the misalignment. Alternatively, if the conveyor is run at a known speed, the misalignment can be calculated indirectly by multiplying the conveyor speed by the time delay "t".

Figure 4:
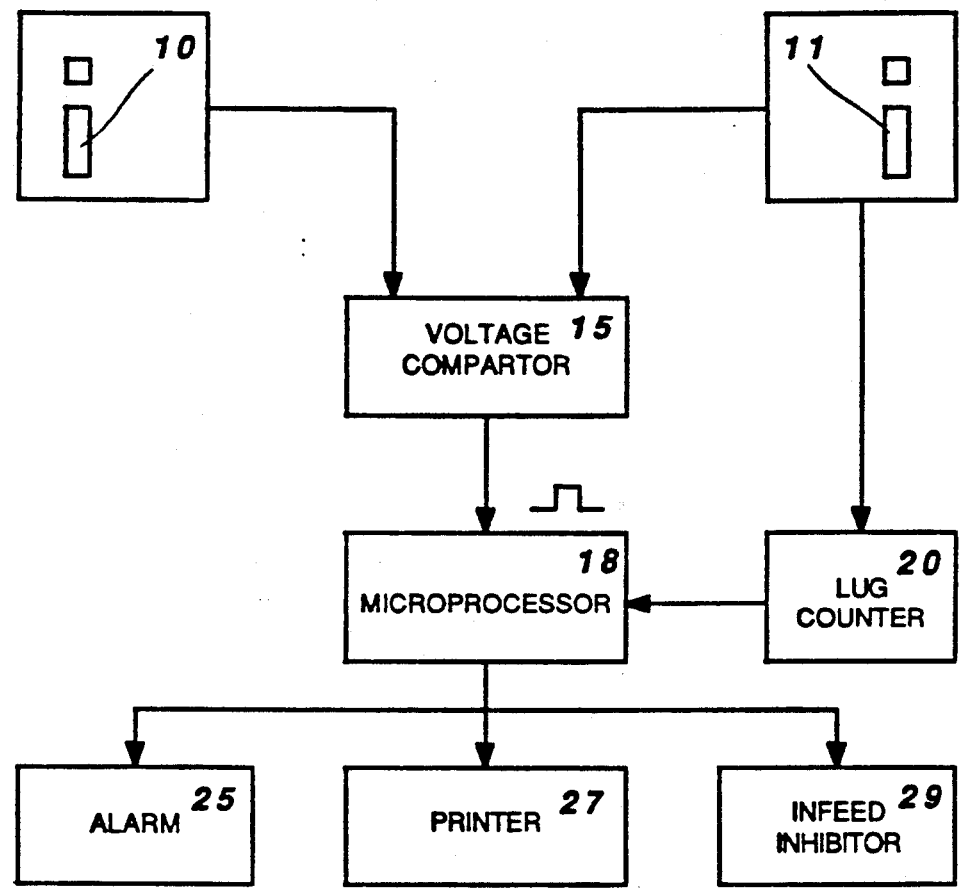
FIG. 4 is a flow chart showing an electrical control system suitable for implementing an embodiment of the present invention which automatically inhibit feeding fresh
 stock into misaligned stations.

In an embodiment of the invention chosen for the purposes of illustration that utilizes a time differential measurement scheme, the outputs of scanners 10 and 11 are monitored by a timing means that measures the time delay "t" between the arrival of signals 12 and 13. It should be appreciated that for a simple system that does not try to detect which lug is in front of the other, there is no need to note whether signal 12 or signal 13 is received first. Rather, the only critical feature is the delay between receiving the first signal and receiving the second signal. As seen in FIG. 4, the timing means may take the form of an analog voltage comparator 15. The voltage comparator 15 transmits a signal 16 having a period identical to time delay "t" to a microprocessor 18. The microprocessor may then be programmed to calculate whether the load station just checked is within tolerances as described above. It will be appreciated that the acceptable length for time delay signal 16 will be a function of the speed at which the conveyor is rotated and the acceptable alignment tolerances. If the conveyor is operable at variable speeds, it may be run at a specific calibration speed during testing, and/or a conventional speedometer or other velocity measuring device can be used to determine the speed at which the lugs are moving while the alignment tests are being run. It should also be appreciated that the timing function of the voltage comparator could alternatively be incorporated into the microprocessor as well.

Once the lugs of a particular load station have been determined to be out of alignment, the operator must be so informed. The conveyor 4 typically has a large number of load stations. Therefore it is desirable to instruct the conveyor feeding mechanism not to feed load stations that are misaligned. To facilitate this, a lug counter 20 is provided that counts the passing lugs to allow the alignment measurement system to identify the specific load stations that are out of alignment. Specifically, each time a signal 12 is outputted by scanner 10, the lug counter 20 is incremented. The lug counter is adapted to count up to the number of load stations carried by the conveyor and then reset. As with the signal comparator, the lug counter 20 may alternatively be incorporated into the microprocessor 18.

Referring now to FIG. 4, microprocessor 18 alerts a system controller or an operator of the load stations that are misaligned. To accomplish this task the microprocessor directs the operation of an alarm 25, a printer 27 and a conveyor feed inhibitor 29. Alarm 25 may take the form of a simple signal such as a warning light that is turned on by the microprocessor. Alternatively, the alarm may notify a control computer of the problem or otherwise indicate the detection of misalignment to an operator. Printer 27 is also controlled by the microprocessor 18 and is expected to provide hard copy printouts indicating the specific load stations that are misaligned and other information considered important such as the operating efficiency, the date and the time. A representative suitable printout is shown in FIG. 6.

The feed inhibitor monitors the conveyor feeding mechanism that loads the conveyor. When a misaligned load station approaches the feeding mechanism, the feed inhibitor instructs the feeding mechanism and/or an operator to skip the defective station. In this way, good quality finger-joint stock or the like is not wasted. In systems that incorporate automatic feeding mechanisms, the feed inhibitor would disable the feeding mechanism when a defective load station approaches. In systems wherein the stock is manually placed on the conveyor 4, the feed inhibitor may simply take the form of a light that is flashed when a defective station approaches.

Figure 5:
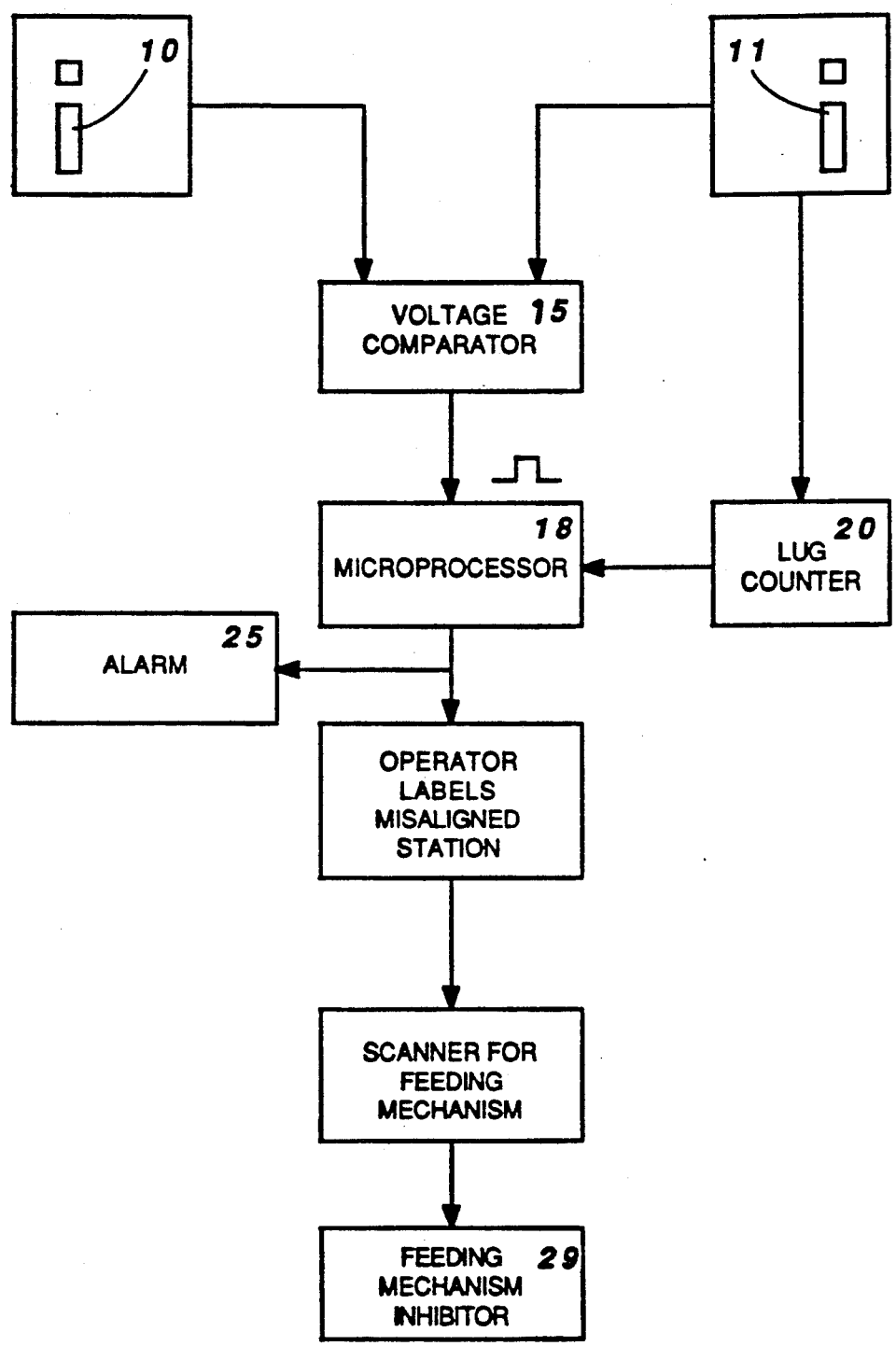
FIG. 5 is a flow chart of an alternative control system for implementing the present invention which immediately alerts an operator of the detection of misaligned stations.

Referring next to FIG. 5, an alternative control structure that utilizes operator assistance is described. The alignment measuring system is identical through the microprocessor which activates an alarm as described above. Upon noticing the alarm, an operator would place a piece of reflective tape on the defective station. When the operator, or a scanner (not shown) disposed directly before the feeding mechanism detects the passage of a station having a piece of reflective tape thereon stock is not loaded onto the defective station.

Figure 7:
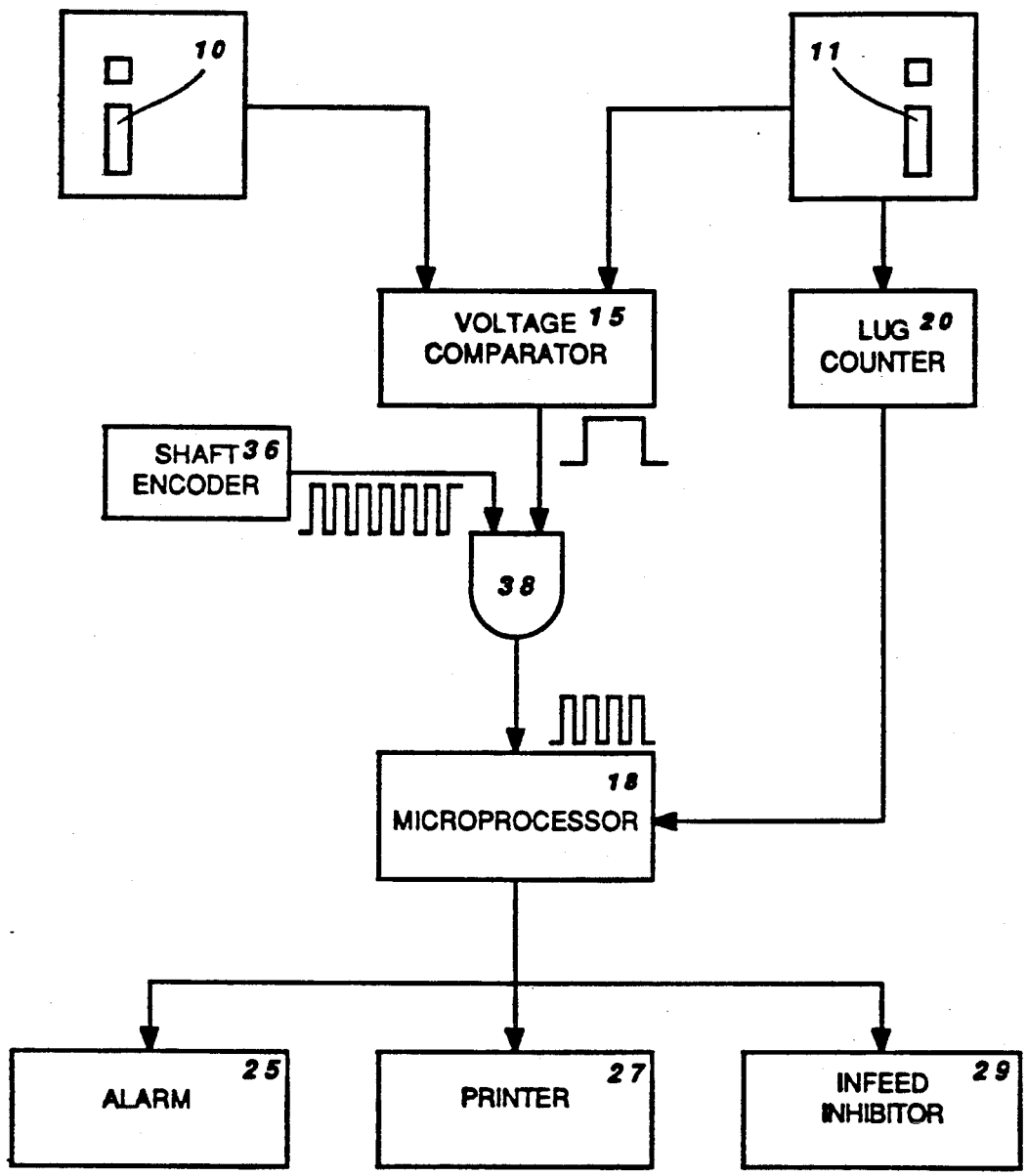
FIG. 7 is a flow chart showing an electrical control system suitable for implementing a shaft encoder embodiment of the invention.

Referring next to FIG. 1, an embodiment of the invention chosen to demonstrate a direct distance measurement will be described. A shaft encoder 36 is directly coupled to the endless conveyor so that its shaft rotates an angular distance that is directly proportional to the travel of the conveyor. The shaft encoder 36 includes a multiplicity of evenly spaced marks that each correspond to an incremental movement by the conveyor. Referring next to FIG. 7, it will be appreciated that an alignment measuring device that incorporates a shaft encoder to make a differential distance measurement may function very similarly in operation to the differential time measurement system discussed above.

Instead of directly measuring the time delay "t" between detection of the first and second lugs, the microprocessor 18 counts the number of shaft marks that are detected at a fixed location during the time delay "t". The misalignment would then be calculated by multiplying the number of marks counted by the incremental distance that each mark represents to determine the misalignment. If a misaligned load station 2 is detected, the system would notify the controller or an operator as discussed above.

Although only a few embodiments of the present invention have been described herein, it should be understood that the present invention may be embodied in many other specific forms without departing from the spirit or scope of the invention. Particularly, the scanners may take the form of a wide variety of conventional transducers and sensors capable of detecting the presence of a lug or some indicia it carries. For example ultrasonic transducers could be used to make substantially instantaneous measurements of the relative lug positions.

Additionally, it should be apparent that although the present invention has been described in terms of a system that triggers off of the leading edges of passing lugs, the system could work equally well using other alignment reference indicia carried by the moving target. For example, holes in continuous pieces and/or a wide variety of other reference marks could readily be used for alignment purposes. The alignment measuring system can be used for a wide variety of applications ranging far beyond the lumber industry applications and conveyor systems described. It should also be appreciated that the alarm signals that notify an operator or the control system may take a wide variety of formats as well. Therefore, the present examples and embodiments are to be considered as illustrative and not restrictive, and the invention is not to be limited to the details given herein, but may be modified within the scope of the appended claims.

I claim:

1. An apparatus for measuring the alignment of two or more adjacent targets having alignment reference indicia while the targets are in motion, the alignment measuring apparatus comprising:
    a first scanner for detecting the alignment reference of a first target, said first scanner producing an output signal that signifies the detection of a target;
    a second scanner for detecting the alignment reference of a second target positioned adjacent the first target;
    timing means for measuring the time differential between detection of the first and second targets; and
    computation means for determining whether said first and second targets are within a selected alignment tolerance based in part upon the differential time measurement.

2. An alignment measuring apparatus as recited in claim 1 wherein said targets are lugs carried by an endless loop.

3. An alignment measuring apparatus as recited in claim 2 wherein said endless loop carries has a multiplicity of load stations at spaced apart intervals about the loop, each said load station having at least two of said lugs.

4. An alignment measuring apparatus as recited in claim 3 wherein said endless loop forms a conveyor for a finger joint machine.

5. An alignment measuring apparatus as recited in claim 3 further comprising counter means for identifying particular load stations.

6. An alignment measuring apparatus as recited in claim 5 further comprising alarm means for signaling the detection of a misaligned load station to an operator, wherein said alarm means indicates the identity of the misaligned load station.

7. An alignment measuring apparatus as recited in claim 3 further comprising lug counting means for identifying the load stations adjacent said first scanner, said counting means incrementing each time a passing load station produces one of said first output signals.

8. An alignment measuring apparatus as recited in claim 7 wherein said computation means and said counting means are embodied in a microprocessor.

9. An alignment measuring apparatus as recited in claim 8 wherein said timing means includes a voltage comparator.

10. An alignment measuring apparatus as recited in claim 8 wherein said timing means is also embodied in said microprocessor.

11. An alignment measuring apparatus as recited in claim 7 wherein said first and second scanners each include a light emitting diode for emitting a light beam and a receiver for receiving the light beam.

12. An alignment measuring apparatus as recited in claim 6 further comprising a feeding mechanism for loading stock onto particular load stations and an infeed inhibitor for preventing the feeding mechanism from loading stock onto load stations that are misaligned.

13. An alignment measuring apparatus as recited in claim 1 wherein said first and second scanners are positioned such that when the targets are properly aligned, the alignment references from said first and second targets will be detected simultaneously.

14. An alignment measuring device for use in conjunction with an endless conveyor having a multiplicity of load stations having at least two adjacent lugs for precisely positioning stock items, the alignment measuring device for checking the alignment of said load stations while the conveyor is in motion, the alignment measuring devise comprising:
   a first LED scanner for detecting the leading edge of a first lug within a first load station, said first scanner producing an output signal that signifies the detection of said first lug;
   a second LED scanner for detecting the leading edge of a second lug within said first load station;
   timing means for measuring the time differential between detection of the first and second targets;
   means for identifying particular load stations;
   computation means for determining whether adjacent targets are within alignment tolerances based in part upon the differential time measurement, wherein when a misaligned load station is detected, the computation means issues an alarm signal that indicates the identity of the particular load station that is misaligned;

15. A method of measuring the alignment of load stations on an endless conveyor belt includes a multiplicity of load stations each having at least two adjacent lugs for precisely positioning stock items, while the conveyor is in motion, the method comprising the steps of:
   detecting the passage of the leading edge of a first one of said lugs;
   detecting the passage of the leading edge of a second one of said lugs within the same load station as said first lug;
   measuring the time differential between the detection of said first and second lugs;
   calculating the misalignment of the first and second lugs using said measured time differential in said calculation.

16. An apparatus for measuring the alignment of two or more adjacent targets having alignment reference indicia while the targets are in motion, the alignment measuring apparatus comprising:
   a first scanner for detecting the alignment reference of a first target, said first scanner producing an output signal that signifies the detection of said first target;
   a second scanner for detecting the alignment reference of a second target positioned adjacent the first target, said second scanner producing a second output signal that signifies the detection of said second target;
   differential means that utilizes said first and second output signals for obtaining a differential measurement indicative of the misalignment between said first and second targets; and
   computation means for determining whether said first and second targets are within a selected alignment tolerance based in part upon the differential measurement.

17. An alignment measuring apparatus as recited in claim 16 wherein said differential measurement is a differential distance measurement.

18. An alignment measuring apparatus as recited in claim 17 wherein said differential means includes a shaft encoder that is mechanically coupled to the targets and rotates at an angular velocity proportional to the velocity of the targets.

19. An alignment measuring apparatus as recited in claim 16 wherein said differential measurement is a differential time measurement.

* * * * *